Oct. 31, 1933.  M. LOUGHEAD  1,932,628
BRAKE SHOE
Filed Feb. 6, 1928   2 Sheets-Sheet 1

Inventor
Malcolm Loughead
By Williams, Bradbury,
McCaleb & Hinkle
Attorneys.

Oct. 31, 1933.  M. LOUGHEAD  1,932,628
BRAKE SHOE
Filed Feb. 6, 1928  2 Sheets-Sheet 2
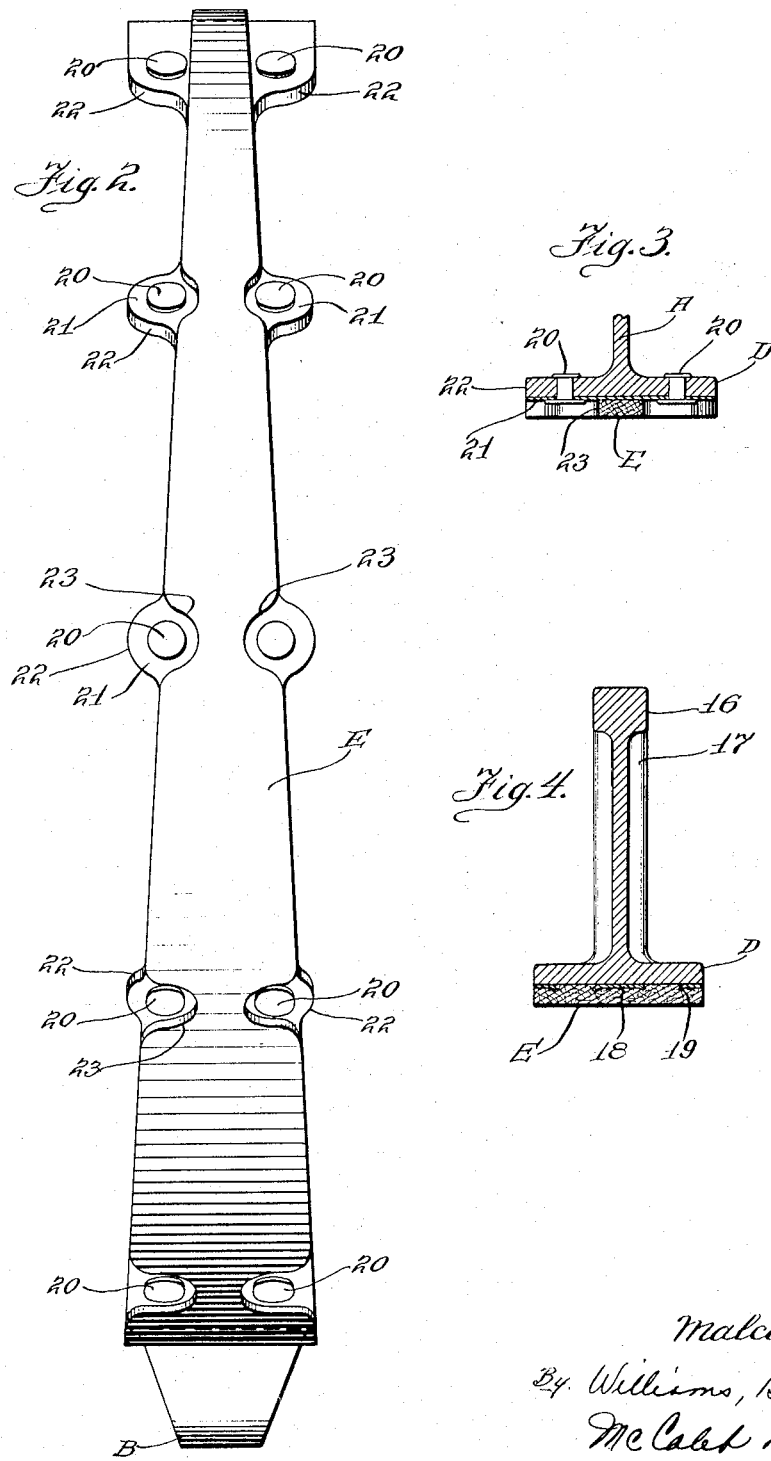

Patented Oct. 31, 1933

1,932,628

UNITED STATES PATENT OFFICE 1,932,628

BRAKE SHOE

Malcolm Loughead, Detroit, Mich., assignor to Hydraulic Brake Company, Los Angeles, Calif., a corporation of California Application February 6, 1928. Serial No. 252,067

4 Claims. (Cl. 188—78)

My invention relates to improvements in brake shoes.

The invention will be explained as embodied in a brake shoe intended for use in an internally expanding wheel brake assembly.

An object of the invention is to provide an improved brake shoe.

A further object is to provide a brake shoe in which the frictional wear upon the lining is equally distributed throughout the entire area of the effective braking surface of the lining.

A further object is to provide a brake shoe in which the premature wearing away of the lining at or near the heel portion of the shoe is precluded.

Another object is to provide a brake shoe which by virtue of the uniform dissipation of the lining through wear eliminates the necessity of adjusting either end of the shoe at its support or actuating means, respectively, with respect to the opposite end.

A further object is to provide a brake shoe having lining which may be applied to the shoe with the exercise of but ordinary skill.

Other objects and advantages will be more particularly pointed out in the following specification and attendant claims.

The invention is illustrated in the acompanying drawings forming a part of this application in which Figure 1 is a plan view of a wheel brake assembly embodying my invention, a part thereof in section;

Figure 2 is a side elevation of one of the brake shoes;

Figure 3 is a sectional view along the line 3—3 of Figure 1; and

Figure 4 is a sectional view along the line 4—4 of Figure 1.

Figure 1:
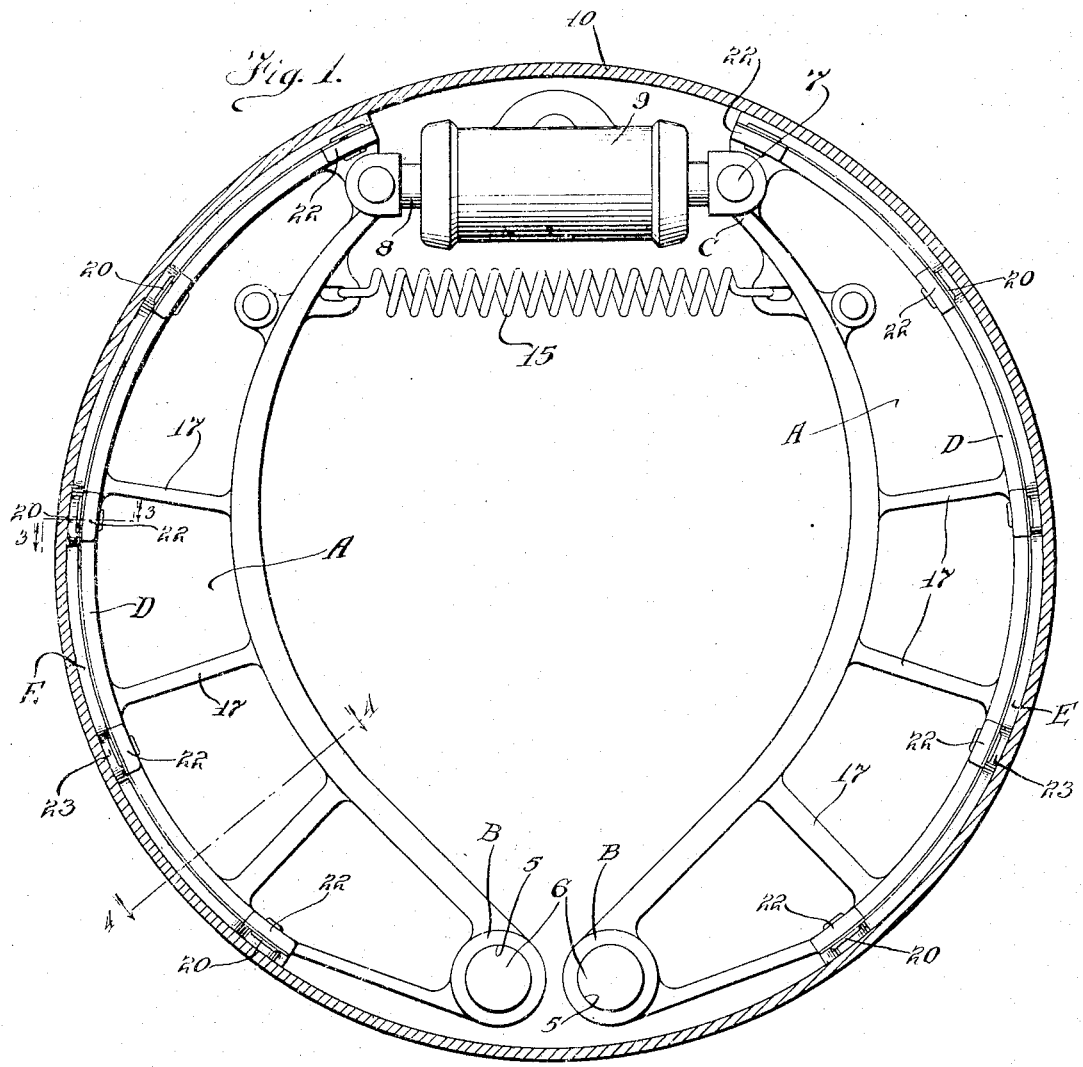

In general, the form of the invention illustrated herein consists of a rigid arcuate body A having a heel B and a toe C, a brake lining supporting surface D gradually increasing in area from the toe toward the heel of the body, and a molded brake lining E of friction material conforming substantially in contour to the supporting surface D.

The heel of body A has a transverse bore 5 therethrough for pivotally supporting the shoe upon a fixed mounting pin 6. The toe C of the body is connected at 7 to the piston rod 8 of a brake shoe actuating motor 9. The motor herein illustrated is of the hydraulic type and is fully disclosed and described in my prior Patent No. 1,468,600, braking apparatus, issued September 18, 1923. The motor when operated moves the shoes, two of which cooperate in the complete wheel assembly herein shown, on their pivotal supports 6, so as to cause the brake lining E to engage with a metallic brake drum 10. A tension spring 15 interconnecting the bodies A of the two shoes serves as a means to normally maintain the shoes out of engagement with the brake drum 10.

The major portion of body A is of relatively thin material, as best shown in Figure 4 and a re-inforcing bead 16 is provided at the inner edge which is connected to the relatively wide and tapering supporting surface D by ribs 17.

I have found through experiment that the ratio of braking power or braking efficiency between the toe and heel of that type of rigid brake shoe illustrated herein and of the internal type is substantially 4 to 1, that is the heel must withstand 4 times the frictional resistance to which the toe is subjected.

This ratio of braking power between the toe and heel would vary, of course, with different types of shoes or flexible bands depending upon the particular design. With the rigid shoe the ratio will vary with the angle of attack of the toe end of the shoe and also will vary with the section of the shoe or rigidity. With the flexible band the tapered lining should be in direct proportion to the input at the cylinder end and the output at the anchored end.

If it were practical to build the drum and shoes of such a section so that there would be practically no flexing in either when the brakes are in operation there would be but a very slight taper to the lining.

The tapering brake lining supporting surface D, has, therefore, been designed and is herein illustrated as having substantially 4 times the area at the heel than at the toe. Thus a brake lining E which conforms in contour, and particularly width, to the supporting surface D, will be subjected to substantially uniform frictional resistance throughout its entire area, and the wearing away of the lining through constant application of the brakes will be uniform throughout its entire length.

The lining E is molded and has imbedded therein a metallic plate 18, portions of which are bent outwardly at 19 well into the body of the material. The band is imbedded in the rear surface of the friction material.

The brake band is secured to the body A by passing rivets 20 through openings in laterally extending projections 21 at each side of the plate 18, and through corresponding laterally projecting lugs 22 formed in the brake lining supporting portion D of the body. In order to accommodate the rivet head and to permit free access to the head, as in fixing the brake band in place, the friction material is laterally recessed, as shown at 23, at all points in registration with the projecting portions 21 of band 18.

In operation, when the motor is actuated, each of the shoes will move upon its pivotal support 6 against the force of spring 15 into engagement with the brake drum 10. Principally due to the building-up process of force imparted to the shoe through the rotation of the drum in that direction toward the heel of the shoe, (in Figure 1 the left shoe, as when the drum is rotating in a counterclockwise direction) through each point of tangency from the toe to the heel, the heel will be subjected to substantially 4 times the frictional resistance to which the toe is subjected. However, since the area of the lining at the heel is substantially 4 times that of the toe, the distribution of wear upon the lining at the heel and the toe will be the same.

I have, therefore, provided a shoe having a brake lining which will wear evenly through its entire length and which, therefore, does not necessitate special adjustment at either the heel or the toe, a practice which is prevalent in the maintenance of the ordinary type of straight brake shoe brake assemblies.

While I have herein illustrated the invention as embodied in a shoe of the rigid type, it should be understood that the invention may be applied with equal success to other types of brake mechanism without departing from the spirit and scope of the invention.

I claim:

1. A brake shoe for vehicle wheel brakes comprising a body member and a brake lining carried by the body, the lining increasing in surface area per unit of length from one end thereof to the other and means for forcing the lining into engagement with the drum, means adapted to exert a force upon said lining for each unit of length thereof substantially proportional to the area of said lining for each unit of length.

2. A brake shoe for vehicle wheel brakes comprising a body member having a brake lining supporting surface, said surface being formed with laterally extending projecting lugs, a brake lining for said shoe, a metal band imbedded in the lower surface of said lining having projections registering with said laterally extending projections, and means associated with the registering projections for securing the band to the brake supporting surface whereby the lining is held in place.

3. In a vehicle wheel brake an annular brake drum, a brake member for engagement with the drum, means for pivotally mounting said brake member at one end, a brake lining therefor increasing in effective width from the toe to the heel portion in a degree determinable by the difference between the distances of the toe and the heel of the lining from the pivoted end of the brake member.

4. A brake member providing a braking surface having length and width, means for pressing the braking surface against a cooperating brake member with a force varying progressively throughout the length of said surface, said surface having a substantially uniform variation in effective width to maintain a substantially equal unit pressure over the entire braking surface.

MALCOLM LOUGHEAD.